United States Patent
Furui et al.

(10) Patent No.: US 11,841,680 B2
(45) Date of Patent: Dec. 12, 2023

(54) TONER AND METHOD FOR PRODUCING TONER

(71) Applicant: CANON KABUSHIKI KAISHA, Tokyo (JP)

(72) Inventors: Takaaki Furui, Tokyo (JP); Atsuhiko Ohmori, Kanagawa (JP); Yasuhiro Hashimoto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 17/405,747

(22) Filed: Aug. 18, 2021

(65) Prior Publication Data
US 2022/0066341 A1   Mar. 3, 2022

(30) Foreign Application Priority Data

Aug. 26, 2020  (JP) .................................. 2020-142843
Jun. 30, 2021  (JP) .................................. 2021-108996

(51) Int. Cl.
| | |
|---|---|
| *G03G 9/087* | (2006.01) |
| *G03G 9/083* | (2006.01) |
| *G03G 9/08* | (2006.01) |
| *B82Y 40/00* | (2011.01) |

(52) U.S. Cl.
CPC ......... *G03G 9/08755* (2013.01); *G03G 9/083* (2013.01); *G03G 9/0819* (2013.01); *G03G 9/08711* (2013.01); *G03G 9/08782* (2013.01); *B82Y 40/00* (2013.01)

(58) Field of Classification Search
CPC .............. G03G 9/0825; G03G 9/0872; G03G 9/09708
See application file for complete search history.

(56) References Cited

U.S. PATENT DOCUMENTS

2020/0292953 A1 *  9/2020  Nakayama ......... G03G 9/09716

FOREIGN PATENT DOCUMENTS

| JP | 2016062041 A | 4/2016 | |
|---|---|---|---|
| JP | 2016224248 A | 12/2016 | |
| JP | 2017-003990 | * 1/2017 | ............. G03G 9/087 |

OTHER PUBLICATIONS

Translation of JP 2017-003990.*

* cited by examiner

*Primary Examiner* — Peter L Vajda
(74) *Attorney, Agent, or Firm* — Canon U.S.A., Inc., IP Division

(57) ABSTRACT

A toner comprising: a toner particle containing a resin component and a wax; and an inorganic fine particle on the surface of the toner particle, wherein, in a cross section of the toner particle, domains containing the wax are observed, and when among the domains, domains having a major diameter of 10-300 nm are defined as domains S, an occupation area percentage of which a ratio of a total sum of areas occupied by the domains S in a region from a surface of the toner particle to a depth of 600 nm in the cross section with respect to an area of the region, is 3.0-15.0%, and wherein the inorganic fine particle contains a fine particle A having a volume resistivity of $1.0 \times 10^3$ to $3.0 \times 10^5$ Ω·cm, and having a relative permittivity εr of 100 or more.

16 Claims, 3 Drawing Sheets

TONER AND METHOD FOR PRODUCING TONER

BACKGROUND

The present disclosure relates to a toner used for an electrophotographic image forming apparatus.

DESCRIPTION OF THE RELATED ART

In recent years, demands for reducing power consumption of electrophotographic image forming apparatuses have intensified. To fulfil demands for reducing power consumption, research on a toner having excellent low-temperature fixability so as to be fixable to media such as paper even at low temperature has been performed.

A method in which the glass transition temperature of a resin component of a toner is lowered for the purpose of improving the low-temperature fixability of the toner is known. However, in the case in which an image is output in a low-temperature environment, a portion of the heat required for fixing tends to transfer to paper or air, and a sufficient amount of heat is not readily provided to the toner. As a result, since a higher fixing temperature is additionally required for fixing the toner, fixing at low temperature tends to become difficult. On the other hand, if the glass transition temperature of the resin component of the toner is excessively lowered, the storage stability of the toner with respect to heat deteriorates. Therefore, a method for further improving the low-temperature fixability of the toner is required.

Consequently, for the purpose of improving the low-temperature fixability of the toner, toners in which the surface vicinity of each toner particle is made to readily melt so that all toner particles are caused to readily and rapidly melt during fixing has been researched. Japanese Patent Laid-Open No. 2016-62041 and Japanese Patent Laid-Open No. 2016-224248 propose toners in which wax is unevenly distributed in the surface vicinity of each toner particle. It is conjectured that wax being unevenly distributed in the surface vicinity of a toner particle facilitates rapid melting of a resin in the surface vicinity of the toner particle during fixing, and excellent low-temperature fixability is provided even in the case in which an image is output in a low-temperature environment.

However, as a result of research on the toners described in Japanese Patent Laid-Open No. 2016-62041 and Japanese Patent Laid-Open No. 2016-224248 performed by the present inventors, it was found that the developability tends to deteriorate in the case in which an image is output after an image forming apparatus is left to stand for a long time in a high-temperature, high-humidity environment. Specifically, it was found that a non-image portion of a fixed image tends to be soiled.

SUMMARY

At least one aspect of the present disclosure is directed to providing a toner that can have superior low-temperature fixability in a low-temperature environment and that may have excellent developability in image output after being left to stand for a long time in a high-temperature, high-humidity environment.

According to one aspect of the present disclosure, there is provided a toner comprising:
a toner particle containing a resin component and a wax; and
an inorganic fine particle on the surface of the toner particle,
wherein, in a cross section of the toner particle, domains containing the wax are observed, and when among the domains, domains having a major diameter of 10-300 nm are defined as domains S, an occupation area percentage of which a ratio of a total sum of areas occupied by the domains S in a region from a surface of the toner particle to a depth of 600 nm in the cross section with respect to an area of the region, is 3.0-15.0%, and wherein the inorganic fine particle contains a fine particle A having a volume resistivity of $1.0 \times 10^3$ to $3.0 \times 10^5$ Ω·cm, and having a relative permittivity εr of 100 or more.

According to the present disclosure, a toner that can have superior low-temperature fixability in a low-temperature environment and that may have excellent developability in image output after being left to stand for a long time in a high-temperature, high-humidity environment is provided.

Further features of the present disclosure will become apparent from the following description of exemplary embodiments with reference to the attached drawings.

DESCRIPTION OF THE EMBODIMENTS

Figure 1:
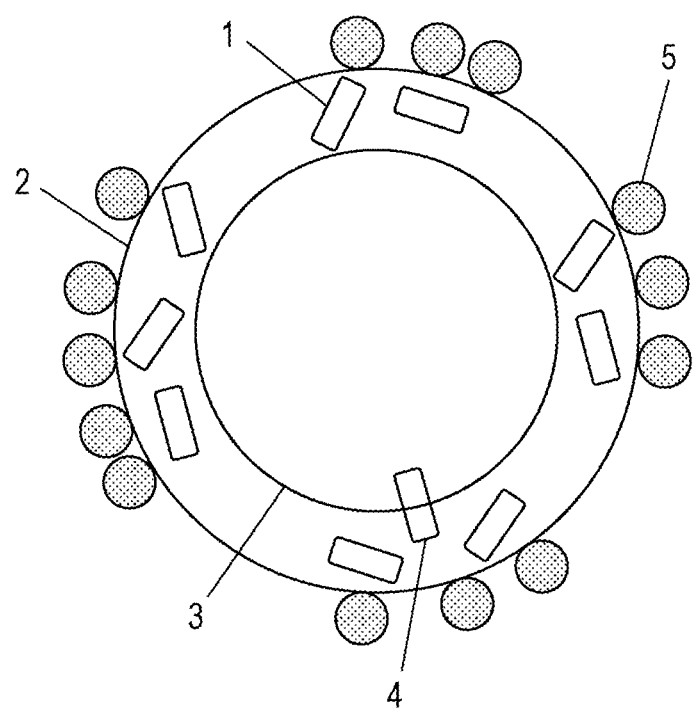
FIG. 1 is a schematic diagram of a toner particle cross section illustrating the assumed mechanism for realizing the effect of the present disclosure.

Descriptions such as "○○ or more and ×× or less" and "○○ to ××" which express a numerical range are numerical ranges including a lower limit and an upper limit, which are end points, unless otherwise specified.

In the case in which numerical ranges are described in a stepwise manner, the upper limit of each numerical range may be combined with the lower limit of any other numerical range.

In the present disclosure, wax domains denote domains containing wax, and fine wax domains denote wax domains having a major diameter of 10 to 300 nm.

The region within 600 nm from the surface of the toner particle observed by cross-sectional observation of the toner particle is a region located between the border line that is the surface of the toner particle and a border line that is 600 nm inside the above-described border line and that is scaled down correspondingly.

A surface vicinity region of a toner particle is a region from a surface of the toner particle to a depth of 600 nm in the cross section of the toner particle.

Factor Responsible for Readily Soiling Non-Image Region and Details of the Disclosure The present inventors conjectured a factor responsible for the easy soiling of the non-image region of a fixed image in the case in which the toner according to Japanese Patent Laid-Open No. 2016-62041 or Japanese Patent Laid-Open No. 2016-224248 is used and an image is output after the toner is left to stand for a long time in a high-temperature, high-humidity environment and described the factor below.

A toner particle in which fine wax domains are dispersed in the surface vicinity of the toner particle readily forms a toner having excellent low-temperature fixability. The present inventors conjectured that this is because the contact area between the dispersed wax and the resin in the surface vicinity of the toner particle is large and compatibilization of the wax and the resin during fixing facilitates melting of the resin in the surface vicinity of the toner particle due to a low heat quantity. In addition, in accordance with melting of the resin in the surface vicinity of the toner particle due to the low heat quantity, rapid melting of all toner particles is facilitated. It can be said that such characteristics are advantageous for enabling a temperature during fixing to be lowered in an electrophotographic image forming apparatus having a high process speed.

However, regarding a toner particle in which fine wax domains are dispersed in the surface vicinity of the toner particle, it is conjectured that the charge distribution in the toner particle tends to become nonuniform. If the charge distribution in the toner particle is nonuniform, the charge distribution of the overall toner tends to become broad, and a toner having an amount of electric charge out of the range of the amount of electric charge suitable for development tends to be formed. It is conjectured that such a toner tends to adhere to not only an image portion of a fixed image but also a non-image portion and, as a result, tends to soil the non-image portion.

The present inventors conjectured that the charge distribution in the toner particle according to Japanese Patent Laid-Open No. 2016-62041 or Japanese Patent Laid-Open No. 2016-224248 tends to become nonuniform because a difference in the amount of electric charge tends to occur between a portion in which wax is present and a portion in which wax is not present in the surface vicinity of the toner particle.

In addition, it was found that the above-described problems considerably appeared when an image was output after a toner was left to stand for a long time in a high-temperature, high-humidity environment. The present inventors conjectured that the amount of electric charge in the surface of a toner particle being influenced by the amount of moisture in air is a contributing factor.

As a result of further research in accordance with the above-described consideration, it was found that a toner including fine particle A having below-described volume resistivity and relative permittivity on the surface of a toner particle does not readily soil a non-image portion of a fixed image regardless of containing fine wax in the surface vicinity of the toner particle.

Volume resistivity of fine particle A: $1.0 \times 10^3$ to $3.0 \times 10^5$ Ω·cm Relative permittivity εr of fine particle A: 100 or more Assumed Mechanism for Realizing Effect of the Present Disclosure An assumed mechanism for realizing the effect of the present disclosure by the above-described toner will be described with reference to FIG. 1.

FIG. 1 is an example of a schematic sectional view of a toner particle according to the present disclosure.

In a region from a border line 2 that is the surface of the toner particle and a border line 3 that is 600 nm inside the border line 2 and that is scaled down correspondingly (surface vicinity region of the toner particle), fine wax domains 1 occupy a specific area percentage. Fine particle 5 (fine particle A) is included near the portions in which wax domains are present in the surface vicinity of the toner particle.

Regarding the toner having the above-described configuration, it is conjectured that the fine wax domains 1 tend to be dispersed in the surface vicinity region of the toner particle and that melting of the resin in the surface vicinity of the toner particle during fixing is facilitated. As a result, a toner having excellent low-temperature fixability is readily obtained.

In this regard, it is conjectured that, when the toner is charged, the amount of electric charge in the vicinity of the portion in which wax is present in the surface vicinity region of the toner particle differs from the amount of electric charge in a portion in which wax is not present. Therefore, it is conjectured that the fine particle 5 (fine particle A) having a high relative permittivity tend to be included on the surface near the portion having a higher amount of electric charge and a stronger electric field. Further, the present inventors conjectured that since the fine particle 5 (fine particle A) have a moderate degree of volume resistivity, an appropriate amount of electric charge readily escapes from a portion having a high amount of electric charge, and charge distribution tends to increase sharply. FIG. 1 illustrates an example of the case when a portion in which wax is present in the surface vicinity of the toner particle has a stronger electric field.

A toner including inorganic fine particle containing strontium titanate, as a specific example of fine particle A according to the present disclosure, on the surface of the toner particle is an aspect according to the present disclosure.

Wax

Occupation Area Percentage of Fine Wax Domains in Toner Particle Surface Vicinity In a cross section of the toner particle, domains containing the wax are observed, and when among the domains, domains having a major diameter of 10-300 nm are defined as domains S, an occupation area percentage of which a ratio of a total sum of areas occupied by the domains S in a region from a surface of the toner particle to a depth of 600 nm in the cross section with respect to an area of the region, is 3.0-15.0%. The present inventors conjectured that the domains having a major diameter of less than 10 nm do not readily contribute to an improvement in the low-temperature fixability of the toner because the size is excessively small.

The occupation area percentage of Domains S (defined as R1) being 3.0% or more enables a toner having excellent low-temperature fixability to be readily obtained. Consequently, R1 is 3.0% or more and more preferably 5.0% or more. In the case in which R1 is 15.0% or less, the resin component in the surface vicinity of the toner particle is not excessively melted, and a toner having excellent heat-resistant storage stability is readily obtained. Consequently, R1 is 15.0% or less, preferably 12.0% or less, more preferably 10.0% or less, and further preferably 9.0% or less.

In addition, an occupation area percentage of which a ratio of a total sum of areas occupied by all wax domains in the surface vicinity region of the toner particle with respect to an area of the region, is preferably 3.0 to 25.0%. It is conjectured that the occupation area percentage of all wax domains (defined as R2) being within the above-described range and R1 being 3.0% to 15.0% enable a toner which has excellent low-temperature fixability and in which it is difficult to embed inorganic fine particle including fine particle A into the surface of the toner particle to be readily obtained. The R2 is more preferably 3.0% to 20.0% and further preferably 3.0% to 15.0%.

The occupation area percentage of wax domains in a region from a surface of the toner particle to a depth of 600 nm in the cross section of the toner particle denotes a percentage of the area of wax domains with respect to the area of the region.

Number of Fine Wax Domains in Toner Particle Surface Vicinity

The number of Domains S in the surface vicinity region of the toner particle is preferably 100 or more. It is conjectured that the number of Domains S being 100 or more facilitates rapid melting of a resin in the surface vicinity of the toner particle during fixing. Consequently, a toner having excellent low-temperature fixability is readily obtained. Therefore, the number of Domains S is preferably 100 or more, more preferably 150 or more, and further preferably 200 or more. There is no particular limitation regarding the upper limit from the viewpoint of low-temperature fixability. However, from the viewpoint of heat-resistant storage stability, the upper limit is preferably 350 or less and more preferably 300 or less.

Number Average Major Diameter of Wax Domains in the Toner Particle Surface Vicinity The number average major diameter of all wax domains in the surface vicinity region of the toner particle is preferably 30 to 150 nm. In the case in which the number average major diameter of all wax domains (A1) is 30 nm or more, a large amount of wax domains of appropriate size is readily included in the surface vicinity region of the toner particle, and a toner having excellent low-temperature fixability is readily obtained. Therefore, A1 is preferably 30 nm or more, more preferably 50 nm or more, and further preferably 70 nm or more. In this regard, since it is conjectured that it is difficult to increase the amount of wax domains having an excessively large size in the surface vicinity region of the toner particle when A1 is 150 nm or less, a toner having appropriate elasticity and heat-resistant storage stability is readily obtained. Therefore, A1 is preferably 150 nm or less, more preferably 120 nm or less, and further preferably 100 nm or less.

The above-described R1, R2, and A1 are controlled in accordance with production conditions (in particular, the cooling step and the annealing step) of the toner particle, conditions for the external addition step, the type of the wax, and the amount of the wax added during toner production. The present inventors conjectured that a step of microcrystallizing wax contained in the toner particle and a step of microcrystallizing wax present in the surface vicinity of the toner particle are further required for setting the above-described R1, R2, and A1 to be within the above-described ranges.

Examples of the step of microcrystallizing wax contained in the toner particle include a step of rapid-cooling and annealing of the toner particle, as described later. It is conjectured that rapid-cooling of the toner particle facilitates formation of crystal nuclei of wax contained in the toner particle, and annealing facilitates crystal growth of the crystal nuclei so as to readily form fine wax domains in the toner particle.

Examples of the step of microcrystallizing wax present in the surface vicinity of the toner particle include a step of externally adding inorganic particle to the toner particle at a temperature at which wax is readily crystallized. It is conjectured that external addition of inorganic fine particle to the toner particle at such a temperature facilitates formation of a large number of crystal nuclei of uncrystallized wax present in the surface vicinity of the toner particle due to an impact from the inorganic fine particle. It is conjectured that, as a result, fine wax domains tend to be formed in the surface vicinity of the toner particle.

Type of Wax

The toner particle can contain an ester wax. It is conjectured that the ester wax is compatible with the resin component. Therefore, the resin component is readily melted during fixing, and a toner having excellent low-temperature fixability is readily obtained.

To readily obtain a toner having excellent low-temperature fixability, the ratio of the mass of the ester wax to the mass of the resin component contained in the toner particle is preferably 10.0% to 20.0% by mass.

There is no particular limitation regarding the ester wax contained in the toner particle, and the following ester wax may be used.

Examples of the ester wax include monofunctional ester waxes such as behenyl stearate, behenyl behenate, and stearyl behenate; difunctional ester waxes such as ethylene glycol distearate, dibehenyl sebacate, and hexanediol dibehenate; trifunctional ester waxes such as glycerin tribehenate; tetrafunctional ester waxes such as pentaerythritol tetrastearate and pentaerythritol tetrapalmitate; hexafunctional ester waxes such as dipentaerythritol hexastearate and dipentaerythritol hexapalmitate; polyfunctional ester waxes such as polyglycerin behenate; and natural ester waxes such as carnauba waxes and rice waxes.

In this regard, wax such as a hydrocarbon wax other than the ester wax may be contained in the toner particle.

Wax Content

The wax content in the toner particle is preferably 5.0% to 25.0% by mass. In the case in which the wax is contained with the above-described content in the toner particle, a toner having excellent low-temperature fixability and releasability is readily obtained. The content is more preferably 5.0% to 15.0% by mass.

Inorganic Fine Particle

Fine Particle A

The inorganic fine particle contains a fine particle A having a volume resistivity of $1.0 \times 10^3$ to $3.0 \times 10^5$ Ω·cm. In the case in which the volume resistivity is $1.0 \times 10^3$ Ω·cm or more, the electric charge charged on the surface of the toner particle is difficult to excessively escape, and toner having excellent chargeability and developability is readily obtained. In the case in which the volume resistivity is $3.0 \times 10^5$ Ω·cm or less, the amount of electric charge that escapes from the toner particle does not become excessively small, and a toner having excellent developability is readily obtained.

The relative permittivity εr of fine particle A is 100 or more. In the case in which the relative permittivity εr is 100 or more, fine particle A tend to be included in a portion in which the amount of electric charge is large on the surface of the toner particle. Therefore, the relative permittivity εr is preferably 100 or more, more preferably 150 or more, and further preferably 200 or more. There is no particular limitation regarding the upper limit, and the upper limit is preferably 1,000 or less, more preferably 500 or less, and further preferably 300 or less. That is, the range of the relative permittivity εr of fine particle A is preferably 100 or more and 300 or less.

The volume resistivity and the relative permittivity εr may be controlled in accordance with the type of the inorganic fine particle externally added to the toner.

Fine particle A can be strontium titanate. Strontium titanate has the above-described volume resistivity and relative permittivity and has high thermal conductivity. Therefore, strontium titanate readily transfers heat to the wax in the surface vicinity of the toner particle during fixing and tends to become a toner having excellent low-temperature fixability.

The inorganic fine particle can include fine particle other than fine particle A above.

Examples of other fine particle include silica fine particle. Examples of the silica fine particle include wet silica based on a precipitation method, a sol-gel method, or the like and dry silica based on a deflagration method, a fume method, or the like. From the viewpoint of dispersibility on the surface of the toner particle, other fine particle can be wet silica fine particle based on a sol-gel method or the like.

To readily obtain a toner having excellent developability, the ratio of the mass of the inorganic fine particle to the mass of the toner particle is preferably 0.10% to 2.00% by mass and more preferably 0.10% to 1.00% by mass.

To readily obtain a toner having excellent developability, the ratio of the mass of fine particle A to the mass of the toner particle is preferably 0.10% to 1.00% by mass and more preferably 0.15% to 0.25% by mass.

Number Average Particle Diameter of Fine Particle A

When number average particle diameter of the fine particle A is defined as A2, the A2 is preferably 10 to 80 nm. In the case in which A2 is within the above-described range, the particle diameter of fine particle A is sufficiently small, and fine particle A readily move on the surface of the toner. Consequently, when an electric field is applied to the toner, fine particle A can readily be present in a portion in which the electric field is strong on the surface of the toner particle.

To suppress a development stripe from readily appearing in a fixed image, the number average major diameter A1 of all wax domains in the surface vicinity of the toner particle and the number average particle diameter A2 of fine particle A can satisfy a relationship denoted by Formula (1) below.

$$0.3 \leq A2/A1 \leq 1.2 \tag{1}$$

Transfer Index of Fine Particle A

The transfer index of fine particle A relative to a polycarbonate film calculated by Formula (2) below is preferably 3.5 to 6.5. The measuring method will be described later.

Transfer index relative to polycarbonate film=area percentage of fine particle A transferred to polycarbonate film [X1]/coverage of surface of toner particle with fine particle A [X2]×100 (2)

The transfer index is a value indicating the degree of readiness of fine particle A in transferring to a polycarbonate film, a larger value indicates that fine particle A readily leave the toner parent body so as to readily transfer to another member. It is conjectured that, in the case in which the transfer index is 3.5 or more, the sticking power of fine particle A to the toner particle does not readily become excessively large, and fine particle A are readily included in a portion in which the electric field is strong on the surface of the toner particle. In the case in which the transfer index is 6.5 or less, the sticking power of fine particle A to the toner particle does not readily become excessively small, and a toner having excellent flowability is readily obtained.

The transfer index of the inorganic fine particle is controlled in accordance with the temperature at which the inorganic fine particle is externally added to the toner particle. The transfer index decreases as the temperature during external addition is increased, and the transfer index increases as the temperature during external addition is lowered.

Weight Average Particle Diameter (D4) of Toner Particle

The weight average particle diameter (D4) of the toner particle is preferably 5.0 to 10.0 μm. In the case in which the weight average particle diameter (D4) of the toner particle is within the above-described range, the charge stability, the fixability, and the developability of the toner tend to be appropriately maintained. D4 of the toner particle is more preferably 5.0 to 9.0 μm.

In the case in which the toner is produced by using pulverization, the weight average particle diameter (D4) of the toner particle may be controlled in accordance with the pulverization condition. In the case in which the toner is produced in an aqueous medium, control is performed in accordance with the amount of a dispersion stabilizer, the number of rotations of an agitator, and the like.

Resin Component

The resin component can be a binder resin. That is, the toner particle can contain the binder resin and the wax.

There is no particular limitation regarding the resin contained in the resin component, and, for example, the following resin may be used.

Examples of the resin include monopolymers of styrene or substituted product thereof such as polystyrenes and polyvinyltoluenes; styrene-based copolymers such as styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-maleic acid copolymers, and styrene-maleic acid ester copolymers; polymethyl methacrylates, polybutyl methacrylates, polyvinyl acetates, polyethylenes, polypropylenes, polyvinyl butyrals, silicone resins, polyesters, polyamide resins, epoxy resins, and polyacrylic acid resins. These may be used alone, or a plurality of types may be used in combination. Of these, in particular, styrene acrylic resins such as styrene-butyl acrylate copolymers can be used from the viewpoint of development characteristics, fixability, and the like. In this regard, the content of the styrene acrylic resin in the resin component is preferably 80.0% to 100.0% by mass.

Styrene Acrylic Resin

Polymerizable monomers corresponding to the monomer unit constituting the styrene acrylic resin are, for example, materials described below.

Examples of the polymerizable monomer include styrene-based polymerizable monomers such as styrene; α-methyl styrene, o-methyl styrene, m-methyl styrene, p-methyl styrene, p-methoxy styrene, and p-ethyl styrene.

Examples of the polymerizable monomer include acrylic polymerizable monomers such as methyl acrylate, ethyl acrylate, n-propyl acrylate, iso-propyl acrylate, n-butyl acrylate, iso-butyl acrylate, tert-butyl acrylate, n-hexyl acrylate, 2-ethylhexyl acrylate, n-octyl acrylate, dodecyl acrylate, stearyl acrylate, 2-chloroethyl acrylate, cyclohexyl acrylate, and phenyl acrylate.

Examples of the polymerizable monomer include methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-hexyl methacrylate, dodecyl methacrylate, 2-ethylhexyl methacrylate, stearyl methacrylate, n-octyl methacrylate, phenyl methacrylate, and diethylaminoethyl methacrylate.

Examples of the polymerizable monomer include other monomers such as acrylonitrile, methacrylonitrile, and acrylamide.

There is no particular limitation regarding the method for producing the styrene acrylic resin. Regarding the resin component, resins other than the styrene acrylic resin may be used in combination.

Polyester P

The toner particle can include a core containing the resin component and the wax and a shell covering the surface of the core, and the shell contains Polyester P having a monomer unit denoted by Formula (3) below.

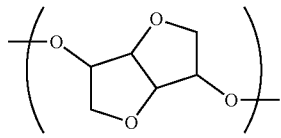
(3)

A toner having excellent developability is readily obtained due to the shell containing a polyester having a monomer unit derived from isosorbide denoted by Formula (3). The present inventors conjectured that the mechanism of this is as described below.

In general, the wax has high hydrophobicity. Therefore, it is conjectured that a portion in which the wax is present in the surface vicinity of the toner particle has a small interaction with moisture in air. Consequently, in particular in a high-humidity environment, a difference in the amount of electric charge tends to occur between the above-described portion and a portion in which wax is not present in the surface vicinity of the toner particle.

On the other hand, the monomer unit derived from isosorbide has a high water absorption property, and regarding the toner particle having the shell containing Polyester P having the monomer unit, the portion in which the wax is present in the surface vicinity of the toner particle tends to also have a large interaction with moisture in air. Therefore, it is conjectured that nonuniform charge in the toner particle tends to be lessened. As a result, the present inventors conjectured that a toner having excellent developability is readily obtained.

Examples of the method for producing the polyester include a method that exploits a dehydration-condensation reaction between a carboxylic acid compound and an alcohol compound and a method that exploits a transesterification reaction. Examples of a catalyst include acid catalysts and alkaline catalysts such as zinc acetate and titanium compounds, which are used for the esterification reaction.

An alcohol component in Polyester P is preferably 43% to 57% by mole, and a carboxylic acid component in Polyester P is preferably 57% to 43% by mole.

The polyester is a resin composed of an alcohol component and a carboxylic acid component, and examples of the two components are as described below.

Examples of the alcohol component include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexane dimethanol, butenediol, octenediol, cyclohexene dimethanol, and hydrogenated bisphenol A; bisphenol denoted by Formula (A) below and derivatives thereof; and diols denoted by Formula (B) below.

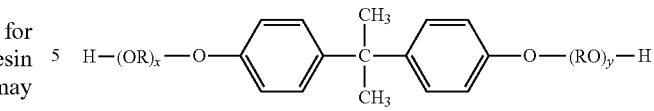
(A)

(In Formula (A), R represents (—CH$_2$—CH$_2$—) or (—CH$_2$—CH$_2$—CH$_2$—), each of x and y is an integer of 1 or more, and an average value of x+y is 2 to 10.)

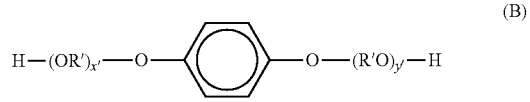
(B)

(B1)

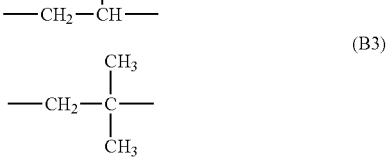
(B2)
(B3)

(In Formula (B), R' represents any one of (B1) to (B3) above, each of x' and y' is an integer of 1 or more, and an average value of x'+y' is 2 to 10.)

The alcohol component of Polyester P can contain bisphenol denoted by Formula (A) or a derivative thereof. The average value of x+y in Formula (A) is more preferably 1 to 4. In particular, R in Formula (A) can be (—CH$_2$—CH$_2$—).

Likewise, the alcohol component of Polyester P can contain ethylene glycol.

Examples of the carboxylic acid component include benzene dicarboxylic acids such as phthalic acid, terephthalic acid, isophthalic acid, phthalic anhydride, diphenyl-PP'-dicarboxylic acid, naphthalene-2,7-dicarboxylic acid, naphthalene-2,6-dicarboxylic acid, diphenylmethane-PP'-dicarboxylic acid, benzophenone-4,4'-dicarboxylic acid, and 1,2-diphenoxyethane-PP'-dicarboxylic acid and anhydrides thereof alkyldicarboxylic acids such as succinic acid, adipic acid, sebacic acid, azelaic acid, glutaric acid, cyclohexane dicarboxylic acid, triethylene dicarboxylic acid, and malonic acid and anhydrides thereof succinic acid substituted with an alkyl group or alkenyl group having a carbon number of 6 to 18 and anhydrides thereof and unsaturated dicarboxylic acids such as fumaric acid, maleic acid, citraconic acid, and itaconic acid and anhydrides thereof.

Of these, the carboxylic acid component of Polyester P can contain terephthalic acid.

In the present disclosure, Polyester P may be obtained by being synthesized from a dicarboxylic acid and a diol, and, as the situation demands, a trivalent or higher polycarboxylic acid or polyol may be used.

The content of Polyester P in the resin component is preferably 0.1% to 10.0% by mass.

Various Additives

As the situation demands, the toner may contain at least one additive selected from a group consisting of colorants, release agents, magnetic materials, charge control agents, and fluidizers. Various additives used for the toner will be specifically described.

Colorant

Examples of a black colorant include carbon black, magnetic materials, and materials toned into black by using yellow, magenta, and cyan colorants described below.

Examples of the yellow colorant include monoazo compounds, disazo compounds, condensed azo compounds, isoindolinone compounds, anthraquinone compounds, azo metal complexes, methine compounds, and allylamide compounds.

Examples of the magenta colorant include monoazo compounds, condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Examples of the cyan colorant include copper phthalocyanine compounds and derivatives thereof, anthraquinone compounds, and basic dye lake compounds.

Magnetic Material

The toner may be a magnetic toner. That is, the toner may be a magnetic toner in which the toner particle contains a magnetic material.

Examples of the magnetic material include materials that contain a magnetic iron oxide such as ferrosol ferric oxide or γ-iron oxide as a primary component and that contain elements such as phosphorus, cobalt, nickel, copper, magnesium, manganese, aluminum, and silicon. That is, the magnetic material contained in the toner particle can be iron oxide. The shape of the magnetic material may be a polyhedron, an octahedron, a hexahedron, a sphere, a spicule, a scale, or the like but can be a less anisotropic shape such as a polyhedron, an octahedron, a hexahedron, a sphere, or the like so as to increase the image density. In this regard, the magnetic material can be a magnetic material subjected to hydrophobization surface treatment.

The content of the magnetic material in the toner particle is preferably 25.0% to 45.0% by mass.

The number average particle diameter of the magnetic material is preferably 0.10 to 0.40 μm. In the case in which the number average particle diameter is 0.10 μm or more, since just the magnetic material is difficult to become reddish black, a high-quality image is readily obtained. In the case in which the number average particle diameter is 0.40 μm or less, the coloring power of the toner becomes favorable, and uniform dispersion in the toner particle is facilitated.

The number average particle diameter of the magnetic material may be measured by using a transmission electron microscope. Specifically, the toner to be observed is sufficiently dispersed into an epoxy resin. Thereafter, a cured product is obtained by performing curing for 2 days in an atmosphere at a temperature of 40° C. The cured product is made into a flake-like sample by using a microtome, and particle diameters of 100 magnetic particles in a field of view of a transmission electron microscope (TEM) image at a magnification of 10,000 to 40,000 times are measured. Subsequently, the number average particle diameter is calculated on the basis of the circle-equivalent diameter of the projected area of the magnetic powder. In this regard, the particle diameter may be measured by using an image analyzer.

Charge Control Agent

Negatively-charging charge control agents are as described below.

Examples of the charge control agent include monoazo metal compounds, acetylacetone metal compounds, aromatic oxycarboxylic acids, aromatic monocarboxylic acids, aromatic dicarboxylic acids, aromatic polycarboxylic acids, oxycarboxylic-acid-based or dicarboxylic-acid-based metal compounds; metal salts, anhydrides, esters thereof, phenol derivatives such as bisphenol, or urea derivatives of aromatic oxycarboxylic acids, aromatic monocarboxylic acids or aromatic polycarboxylic acids; metal-containing salicyclic-acid-based compounds, metal-containing naphthoic-acid-based compounds, boron compounds, quaternary ammonium salts, calixarene, and resin-based charge control agents.

Positively-charging charge control agents are as described below.

Examples of the charge control agent include nigrosine and nigrosine modified with fatty acid metal salts; guanidine compounds; imidazole compounds, tributylbenzylammonium-1-hydroxy-4-naphthosulfonic acid salts, and quaternary ammonium salts such as tetrabutylammonium tetrafluoroborate and analogs of these, for example, onium salts such as phosphonium salts, and lake pigments thereof; triphenylmethane dyes and lake pigments thereof (lake formers are phosphotungstic acid, phosphomolybdic acid, phosphotungstomolybdic acid, tannic acid, lauric acid, gallic acid, ferricyanide, ferrocyanide, and the like); metal salts of higher fatty acids; diorganotin oxides such as dibutyltin oxide, dioctyltin oxide, and dicyclohexyltin oxide; diorganotin borates such as dibutyltin borate, dioctyltin borate, and dicyclohexyltin borate; and resin-based charge control agents.

These may be used alone, or at least two types may be used in combination.

Of these, metal-containing salicyclic-acid-based compounds can be used. In particular, the contained metal can be aluminum or zirconium, and further, aluminum salicylate compounds are used.

Likewise, of these, polymers or copolymers having a sulfonic acid group, a sulfonic acid salt group or sulfonic acid ester group, a salicylic acid section, or a benzoic acid section can be used.

The content of the charge control agent is preferably 0.01 parts by mass or more and 20.0 parts by mass or less and more preferably 0.05 parts by mass or more and 10.0 parts by mass or less relative to 100.0 parts by mass of the resin component.

Method for Producing Toner

The toner may be produced by using any one of a pulverization method, a suspension polymerization method, an emulsion aggregation method, a dissolution suspension method, and the like, but the method is not limited to these. To readily control the presence state of the wax contained in the toner particle, the toner can be produced by using the suspension polymerization method.

The cooling step and the annealing step that can be included in the method for producing a toner according to the present disclosure will be described below.

Regarding the cooling step, a cooling step of lowering the temperature of the toner particle dispersion liquid subjected to a volatile component removing step from a cooling start temperature to a cooling reach temperature can be performed before sending to the next step. It is conjectured that ease of formation of crystal nuclei of wax domains in the toner particle is controlled in accordance with the condition for the cooling step. The condition for the cooling is changed by changing the cooling start temperature, the cooling rate, and the cooling reach temperature.

The method for producing a toner can include a maintaining step of maintaining the toner particle dispersion liquid at Ta+15 (° C.) to Ta+35 (° C.) where the crystallization peak temperature of the wax is denoted as Ta (° C.). It is conjectured that the step of maintaining the toner particle within the above-described temperature range being included improves the flowability of the wax in the toner particle and facilitates dispersion of the wax into the toner particle.

In addition, the method for producing a toner can include a cooling step of cooling the dispersion liquid subjected to the maintaining step at a cooling rate of 40.0° C./min to 200.0° C./min from the cooling start temperature to the cooling reach temperature.

It is conjectured that in the case in which the cooling rate is within the above-described range, the wax is sufficiently rapidly crystallized in accordance with the cooling, and formation of crystal nuclei of wax domains in the toner particle is facilitated. The cooling rate is more preferably 100.0° C./min to 140.0° C./min.

The cooling start temperature is preferably Ta+15 (° C.) to Ta+35 (° C.), and the cooling reach temperature is preferably Ta−35 (° C.) to Ta−20 (° C.).

The cooling start temperature can be within the above-described range because the wax is readily melted in the toner particle, and the wax is readily dispersed throughout the toner particle.

It is conjectured that in the case in which the cooling reach temperature is within the above-described range, the wax in the toner particle is rapidly crystallized, and a large number of crystal nuclei of the wax are readily formed in the toner particle. It is conjectured that since a large number of crystal nuclei are formed, wax domains tend to be suppressed from crystal-glowing and merging, and fine wax domains tend to be formed.

The dispersion liquid subjected to the cooling step can be subjected to the annealing step to facilitate crystallization of the wax. It is conjectured that, in the annealing step, the wax tends to be microcrystallized around crystal nuclei formed during the cooling step.

The condition for the annealing step may be determined in accordance with the annealing temperature and the annealing time. Regarding the annealing temperature and the annealing time, the above-described dispersion liquid can be maintained at Ta−35 (° C.) to Ta−20 (° C.) for 30 min or more. The time of the annealing step is preferably 150 min or less.

In addition, after toner particle is removed from the dispersion liquid subjected to the annealing, an externally adding step of mixing the resulting toner particle with inorganic fine particle at Ta−35 (° C.) to Ta−20 (° C.) can be included. It is conjectured that external addition of inorganic fine particle to the toner particle at such a temperature facilitates formation of a large number of crystal nuclei of uncrystallized wax present in the surface vicinity of the toner particle due to an impact from the inorganic fine particle. The present inventors conjectured that, as a result, fine wax domains tend to be formed in the surface vicinity of the toner particle. The number of rotations during mixing in the externally adding step is preferably 1,500 to 2,500 rpm.

The toner can be produced through the above-described production steps because R1 and A1 above tend to satisfy the above-described favorable ranges.

That is, the method for producing a toner can include the steps of
(i) a step of forming, in an aqueous medium, a particle containing a wax and a polymerizable monomer,
(ii) a step of obtaining a dispersion liquid including a toner particle that contains the wax and a resin component obtained by polymerizing the polymerizable monomer contained in the particle,
(iii) a maintaining step of maintaining the dispersion liquid at Ta+15 (° C.) to Ta+35 (° C.) where Ta denotes the crystallization peak temperature of the wax contained in the toner particle,
(iv) a cooling step of cooling the dispersion liquid to Ta−35 (° C.) to Ta−20 (° C.) from Ta+15 (° C.) to Ta+35 (° C.), with a cooling rate of 40.0° C./min to 200.0° C./min,
(v) an annealing step of maintaining the dispersion liquid at Ta−35 (° C.) to Ta−20 (° C.) for 30 min or more, (vi) a step of removing the toner particle from the dispersion liquid, and
(vii) an externally adding step of externally adding inorganic fine particle to the toner particle removed at Ta−35 (° C.) to Ta−20 (° C.), wherein the inorganic fine particle contains a fine particle A having a volume resistivity of $1.0 \times 10^3$ to $3.0 \times 10^5$ Ω·cm, and having a relative permittivity εr of 100 or more.

In the case in which a plurality of types of waxes are contained in the toner particle, the value of Ta (° C.) above is set to be the crystallization peak temperature of the wax with the largest content in the toner particle.

Various Measuring Methods and the Like

Various measuring method will be described below.
Method for Measuring Occupation Area Percentage of Fine Wax Domains in Region in Toner Particle Surface Vicinity
(1) Observation of Toner Cross Section by Using STEM To observe a crystalline material such as wax inside the toner, after a slice of the toner is produced, dyeing with ruthenium tetroxide is performed, and STEM observation is performed. Dyeing with ruthenium tetroxide generates a difference in contrast between an amorphous resin such as a binder resin and a crystalline material such as wax during STEM observation. Consequently, a crystalline material such as wax is readily distinguished and observed.

Initially, the toner is dispersed into a visible-light-curable resin (trade name: ARONIX LCR Series D-800 produced by TOAGOSEI Co., Ltd.), and curing is performed by applying short-wavelength light. A 250-nm flake-like sample is produced by being cut out of the resulting cured product by using an ultramicrotome with a diamond knife.

Subsequently, the cut out sample is enlarged at a magnification of 40,000 to 50,000 times by using a transmission electron microscope (trade name: Electron Microscope JEM-2800, produced by JEOL LTD.) (TEM-EDX) so as to obtain a cross-sectional image of the toner particle.

In this regard, the toner particle to be observed is selected as described below.

The cross-sectional area of a toner particle is determined from the cross-sectional image of the toner particle, and the diameter of a circle having an area equal to the cross-sectional area (circle-equivalent diameter) is determined. The cross-sectional image of only a toner particle having the circle-equivalent diameter that differs from the weight average particle diameter (D4) of the toner particle by 1.0 µm or less on an absolute value basis is observed.
(2) Binarization by Using Image Analysis Software The wax domain portion of the TEM image is binarized by using image analysis software. In the present disclosure, binarization was performed by using ImageJ that is image analysis software. Regarding the condition for binarization, the condition for binarization is automatically determined by using a discriminant analysis method which is selected by [Image]-[Adjust]-[Auto Threshold]-[Method:Otsu] in ImageJ. However, in the case in which a material having different brightness is observed in addition to wax domains, a histogram of the brightness of the image is calculated, a threshold value is determined by using the discriminant analysis method, and binarization is performed by using upper and lower threshold values of the region including wax domains.

Regarding the cross-sectional observation of the toner particle, as an example of the measurement of the occupation area percentage of wax domains in a specific region, the measurements of the occupation area percentage of wax domains and the number average value of wax domains in the region from a surface of the toner particle to a depth of 600 nm in the cross section of the toner particle will be described below.

The TEM image before binarization is opened again by using ImageJ, and the border line of the toner particle is extracted by selecting [Process]-[Find Edge]. The position of the center of gravity of the toner particle is determined by selecting [centroid] from [Analyze]-[Set Measurements] and, thereafter, selecting [Analyze]-[Analyze Particles], and the length from the position of the center of gravity to any border line of the toner particle is determined. The image is scaled down so that the length up to the border line is decreased by 600 nm by selecting [Image]-[Scale]. The scaled-down image is superposed on the image in which wax domains are binarized at first so as to mask the region 600 nm or more distant from the surface of the toner particle.
(3) Method for Measuring Occupation Area Percentage R1 of Wax Domains Having Major Axis of 10 to 300 nm in a Region from a Surface of the Toner Particle to a Depth of 600 nm (a Surface Vicinity Region of the Toner Particle)

In ImageJ, after the above-described binarization operation is completed, the total area and major diameters of wax domains are determined and the total area of domains having a major diameter of 10 nm or more and 300 nm or less is calculated by selecting [Feret's Diameter] and [Area] from [Analyze]-[Set Measurements] and, thereafter, selecting [Analyze]-[Analyze Particles]. In addition, toner particle border line extraction images before and after scale-down are used, and the entire region within 600 nm from the toner particle surface is binarized. The area of the region within 600 nm from the surface of the toner particle is determined by selecting [Analyze]-[Analyze Particles], and the occupation area percentage of wax domains having a major diameter of 10 nm or more and 300 nm or less is determined.

The above-described operation is performed with respect to STEM cross-sectional images of 10 toner particles. The average value of the resulting occupation area percentages of wax domains having a major diameter of 10 nm or more and 300 nm or less is denoted as R1, and the average value of the number of the wax domains is assumed to be the number of the wax domains. The number average value A1 of the major diameters of the wax domains is calculated from the major diameters determined above.

In the case in which a wax domain crosses a border line 3 that is 600 nm inside the border line 2 of the toner particle cross section in the direction toward the center of the gravity and that is scaled down correspondingly from the border line 2, as a wax domain 4 illustrated in FIG. 1, the wax domain is assumed to be not included in the region.
Method for Measuring Relative Permittivity and Volume Resistivity The relative permittivity and the volume resistivity are values intrinsic to a substance and may be calculated on the basis of the following measurements.

Regarding measurement of the relative permittivity of fine particle, a power supply, SI 1260 electrochemical interface (produced by TOYO Corporation) serving as an ammeter, and 1296 dielectric interface (produced by TOYO Corporation) serving as a current amplifier are used.

Regarding the measurement sample, a tablet-forming machine is used, and a sample heat-formed into a disc-like shape having a thickness of 3.0±0.5 mm is used. A circular metal electrode having a diameter of 10 mm is produced on each of the upper and lower surfaces of the sample by using mask vapor deposition.

Measurement electrodes are attached to the resulting measurement sample, and capacitance and impedance are measured by applying an AC voltage having a peak-to-peak voltage (Vp–p) of 100 V with a frequency of 0.1 MHz. The relative permittivity εr and volume resistivity ρv of the measurement sample are calculated by using the following formula.

$$\varepsilon r = dC/\varepsilon_0 S \cdot \rho v = ZS/d$$

d: thickness of measurement sample (m); C: capacitance (F); co: permittivity of vacuum (F/m); S: electrode area (m$^2$); and Z: impedance (Ω)

Measurement of Number Average Particle Diameter A2 of Fine Particle a Included on Surface of Toner Particle The number average particle diameter of fine particle A is measured by using a scanning electron microscope "S-4800" (produced by Hitachi High-Technologies Corporation). The toner particle to which inorganic particle is externally added is observed. In a field of view at a magnification of 50,000 times at maximum, major diameters of randomly chosen 100 fine particles A are measured and the number average particle diameter is determined. The magnification during observation is appropriately adjusted in accordance with the size of inorganic particle. Just the number average particle diameter of fine particle A is extracted by specifying, in advance, the circle-equivalent diameter and the circularity of fine particle A externally added to the toner particle and setting the values of these.
Method for Measuring Transfer Index of Fine Particle A Regarding the technique to indicate the sticking state of fine particle A by an index, the amount of transfer of fine particle A when a toner is brought into contact with a substrate is evaluated. Regarding the material for forming the surface layer of the substrate in the present disclosure, a substrate in which a polycarbonate resin is used as the surface layer material is used as a substrate that simulates the surface layer of a photosensitive member. Specifically, a coating solution is produced by dissolving a bisphenol-Z-type polycarbonate resin (trade name: Iupilon Z-400, produced by Mitsubishi Engineering-Plastics Corporation, viscosity average molecular weight (Mv): 40,000) into toluene so that the concentration becomes 10% by mass.

The resulting coating solution is applied to an aluminum sheet having a thickness of 50 μm by using Meyer bar of 50 gauge so as to form a coating film. The resulting coating film is dried at 100° C. for 10 min so as to produce a sheet having a polycarbonate resin layer (film thickness of 10 μm) on the aluminum sheet. The resulting sheet is held by a substrate holder. The substrate is made to be a square having a side of about 3 mm.

The measurement step is divided into a step of arranging a toner on a substrate, a step of removing the toner from the substrate, and a step of quantifying the amount of fine particle A fed and attached to the substrate and will be described below.
Step of Arranging Toner on Substrate A toner is included into a porous flexible material (hereafter referred to as a "toner holding body"), and the toner holding body is brought into contact with the substrate. A sponge (trade name: White Wiper produced by MARUSAN INDUSTRY CO., LTD.) is used as the toner holding body. The toner holding body is fixed to the front edge of a load meter fixed to a stage that moves in a direction perpendicular to the contact surface of the substrate so that the toner holding body and the substrate are brought into contact with each other while the load is measured. Regarding contact between the toner holding body and the substrate, the step of moving the stage, pushing the toner holding body against the substrate until the load meter indicates 10 N, and, thereafter, performing separation is assumed to be one step, and this step is repeated 5 times.

Step of Removing Toner from Substrate

An elastomer suction port that has an inner diameter of about 5 mm and that is connected to the nozzle front edge of a vacuum cleaner is brought close to the substrate after contact with the toner holding body so as to become perpendicular to the surface provided with the toner. At this time, the toner is removed while the degree of remaining is visually checked. The distance between the edge portion of the suction port and the substrate is set to be 1 mm, the suction time is set to be 3 sec, and the suction pressure is set to be 6 kPa.

Step of Quantifying Amount of Fine Particle a Fed and Attached to Substrate

In digitization of the amount and the shape of fine particle A remaining on the substrate after the toner is removed, observation and image measurement by using a scanning electron microscope is performed. Initially, an observation sample is produced by sputtering platinum on the substrate after the toner is removed under the condition of a current of 20 mA for 60 sec. The above-described scanning electron microscope is used, and a reflection electron image obtained from the observation sample is observed. The observation magnification is set to be 50,000 times, the acceleration voltage is set to be 10 kV, and the operation dimension is set to be 3 mm. Regarding the image obtained by observation, since inorganic particle is indicated with high brightness, and the substrate is indicated with low brightness, the amount of fine particle A in the field of view is quantified by using binarization. The condition for binarization is automatically determined by using a discriminant analysis method which is included in [Auto Threshold] of ImageJ. In the present disclosure, ImageJ that is image analysis software was used for binarization of an image. The area percentage of fine particle A in the observation field of view is determined by integrating just the area of fine particle A with ImageJ and performing division by the area of the entire observation field of view. Just the area of fine particle A is extracted by specifying, in advance, the circle-equivalent diameter and the circularity of fine particle A externally added to the toner particle and setting the values of these. The above-described measurement is performed with respect to 100 binarized images, and the average value thereof is taken as the area percentage of fine particle A on the substrate [X1] (unit: % by area).

Subsequently, the coverage of the surface of the toner particle with fine particle A [X2] (unit: % by area) is calculated. The coverage with fine particle A is measured on the basis of the above-described observation and image measurement by using the scanning electron microscope. In the observation by using the scanning electron microscope, the same magnification as the magnification for the observation of fine particle A on the substrate is adopted as the observation magnification to observe fine particle A.

The procedure to calculate the transfer index will be described below.

(1) Production of Sample

A sample stage (aluminum sample stage of 15 mm×6 mm) is thinly coated with an electroconductive paste, and a toner is blown thereon. Further, air blowing is performed so as to remove an excess toner from the sample stage and to sufficiently dry. The sample stage is set into a sample holder, and the height of the sample stage is adjusted to 36 mm by using a sample height gauge.

(2) Setting of S-4800 Observation Condition

The coverage with fine particle A [X2] is calculated by using the image obtained on the basis of S-4800 reflection electron image observation. Since charge up of a reflection electron image is less than a secondary electron image, the coverage with fine particle A [X2] is accurately measured.

An anti-contamination trap attached to a casing of S-4800 is filled with liquid nitrogen until overflow occurs and is left to stand for 30 minutes. "PC-SEM" of S-4800 is actuated, and flushing (cleaning of FE chip serving as an electron source) is performed. An acceleration voltage display portion of a control panel on the screen is clicked, and a [Flushing] button is pushed so as to open a flushing execution dialog. It is checked that the flushing strength is 2, and the flushing is executed. It is checked that the emission current due to flushing is 20 to 40 µA. The sample holder is inserted into a sample chamber of the casing of S-4800. "Starting point" on the control panel is pushed so as to move the sample holder to an observation position. The acceleration voltage display portion is clicked so as to open an HV setting dialog, the acceleration voltage is set to be [0.8 kV], and the emission current is set to be [20 µA]. In a tab [Base] of the operation panel, signal selection is set to be [SE]. Regarding an SE detector, [Up (U)] and [+BSE] are selected, and [L.A. 100] is selected in a right selection box of [+BSE] so as to set the mode in which a reflection electron image is observed.

In addition, in the tab [Base] of the operation panel, a probe current in an electron optical system condition block is set to be [Normal], a focus mode is set to be [UHR], and WD is set to be [3.0 mm]. A [ON] button in the acceleration voltage display portion of the control panel is pushed so as to apply an acceleration voltage.

(3) Focus Adjustment

Dragging is performed in a magnification display portion of the control panel so as to set the magnification to be 5,000 (5 K) times. A focus knob [COARSE] of the operation panel is rotated, and when focusing is performed to some extent in the entire field of view, aperture alignment is adjusted. [Align] of the control panel is clicked so as to display an alignment dialog, and [Beam] is selected. STIGMA/ALIGNMENT knobs (X,Y) of the operation panel are rotated so as to move a displayed beam to the center of concentric circles. Subsequently, [Aperture] is selected, and the STIGMA/ALIGNMENT knobs (X,Y) are rotated one by one and adjusted so as to stop movement of the image or to minimize movement of the image. The aperture dialog is closed, and focusing is performed automatically. This operation is further repeated two times so as to perform focusing.

Regarding the target toner, in the state in which the middle point of the maximum diameter is in accord with the center of the measurement screen, dragging is performed in the magnification display portion of the control panel so as to set the magnification to be 10,000 (10 k) times. The focus knob [COARSE] of the operation panel is rotated, and when focusing is performed to some extent, aperture alignment is adjusted. [Align] of the control panel is clicked so as to display the alignment dialog, and [Beam] is selected. STIGMA/ALIGNMENT knobs (X,Y) of the operation panel are rotated so as to move a displayed beam to the center of concentric circles.

Subsequently, [Aperture] is selected, and the STIGMA/ALIGNMENT knobs (X,Y) are rotated one by one and adjusted so as to stop movement of the image or to minimize movement of the image. The aperture dialog is closed, and focusing is performed automatically. Thereafter, the magnification is set to be 50,000 (50 k) times, focus adjustment is performed by using the focus knob and the STIGMA/ALIGNMENT knobs in the same manner as above, and focusing is performed again automatically. This operation is repeated again so as to perform focusing. In this regard, if the inclination angle of an observation surface is large, the measurement accuracy of the coverage tends to be deteriorated. Therefore, an observation surface in which the surface is hardly inclined is selected by selecting the observation surface, the entirety of which is focused at the same time, when focusing is performed, and analysis is performed.

(4) Image Saving

The brightness is adjusted in an ABC mode, and imaging and saving are performed at a size of 640×480 pixels. The resulting image file is used, and the following analysis is performed. Imaging is performed on a toner particle basis, images of at least 100 toner particles are obtained.

The observed image is binarized by using ImageJ that is image analysis software. After binarization, just fine particle A is extracted by selecting [Analyze]-[Analyze Particles] and setting the circle-equivalent diameter and the circularity of fine particle A concerned, and the coverage of the surface of the toner particle with fine particle A (unit: % by area) is determined. The above-described measurement is performed with respect to binarized 100 images, and the average value of the coverage with fine particle A (unit: % by area) is taken as the coverage with fine particle A [X2].

The transfer index of fine particle A is calculated from the area percentage of fine particle A on the substrate [X1] and the coverage with fine particle A [X2] by using a formula described below.

transfer index of fine particle $A$=area percentage of fine particle $A$ on substrate[$X1$]/coverage with fine particle $A$[$X2$]×100

Observation of Presence or Absence of Shell of Toner Particle

The observation of presence or absence of a shell of the toner particle may be performed by observing the form of the cross section of the toner particle. A specific method for observing the form of the cross section of the toner particle is as described below.

Initially, toner particle is sufficiently dispersed into a light-curable epoxy resin. Thereafter, cured product is obtained by applying ultraviolet rays so as to cure the epoxy resin. The resulting cured product is cut by using a microtome with a diamond blade so as to produce a flake-like sample having a thickness of 100 nm. The sample is subjected to dyeing with ruthenium tetroxide, as the situation demands. Subsequently, a transmission electron microscope (TEM) (trade name: Electron Microscope Tecnai TF20XT, produced by FEI) is used, and a cross section of the toner particle is observed under the condition of an acceleration voltage of 120 kV so as to obtain a TEM image.

In the above-described observation method, in the case in which a shell is present, and the component of the core differs from the component of the shell, a contrast due to the state of dyeing or element mapping is observed. The observation magnification is set to be 20,000 times.

Detection of Monomer Unit Derived from Isosorbide Present on Surface of Toner Particle TOF-SIMS (TRIFT-IV produced by ULVAC-PHI, Inc.) is used for detecting the monomer unit derived from isosorbide present on the surface of the toner particle. The analysis condition is as described below.

Sample adjustment: the toner particle is attached to an indium sheet
Sample pretreatment: none
Primary ion: Au+
Acceleration voltage: 30 kV
Charge neutralization mode: On
Measurement mode: Positive
Raster size: 100 μm
Integration time: 180 sec Polyester P that is present on the surface of the toner and that has the monomer unit derived from isosorbide is detected by performing the above-described measurement. Presence of a shell of the toner particle is checked by observation, and whether the shell contains Polyester P is determined by performing the above-described measurement.

Method for Measuring Crystallization Peak Temperature of Sample

The crystallization peak temperature of the sample is measured in conformity with ASTM D3418-82 by using a differential scanning calorimeter "Q2000 (produced by TA Instruments)".

The temperature calibration of the detection portion of the apparatus uses the melting temperatures of indium and zinc, and calibration of the heat quantity uses the heat of fusion of indium.

Specifically, 2 mg of sample is precisely weighed and is placed into an aluminum pan. An empty aluminum pan is used for reference.

The measurement temperature range is set to be −10° C. to 200° C., and the measurement is performed at a temperature rise rate of 10° C./min. Regarding the measurement, the temperature is once raised from −10° C. to 200° C. at a temperature rise rate of 10° C./min, and the temperature is decreased from 200° C. to −10° C. at a temperature decrease rate of 10° C./min.

Thereafter, the temperature is raised again from −10° C. to 200° C. at a temperature rise rate of 10° C./min.

The crystallization peak temperature is obtained from a DSC curve in the temperature range of 200° C. to −10° C. during the first temperature decrease.

Regarding the DSC curve during the first temperature decrease, the temperature at which the peak is highest, where the lines before and after an occurrence of change in the specific heat constitute the base line, is taken as the crystallization peak temperature.

Method for Measuring Weight Average Particle Diameter (D4) of Toner Particle

The weight average particle diameter (D4) of the toner particle is measured as described below.

Regarding the measuring apparatus, an accurate particle size distribution analyzer "Coulter Counter Multisizer 3" (registered trademark, produced by Beckman Coulter, Inc.) on the basis of an aperture impedance method is used. Regarding setting of the measurement conditions and analysis of measurement data, attached dedicated software "Beckman Coulter Multisizer 3 Version 3.51" (produced by Beckman Coulter, Inc.) is used. In this regard, the measurement is performed with the number of effective measurement channels of 25,000.

Regarding an electrolytic aqueous solution used for the measurement, a solution in which analytical grade sodium chloride is dissolved into deionized water so as to have a concentration of 1% by mass, for example, "ISOTON II" (produced by Beckman Coulter, Inc.) is used.

Before the measurement and the analysis are performed, the dedicated software is set as described below.

In a "Changing standard operation method (SOM)" screen of the dedicated software, the total count number in the control mode is set to be 50,000 particles, the number of measurements is set to be 1, and a Kd value is set to be a value obtained by using "Standard particles 10.0 μm" (produced by Beckman Coulter, Inc.). A threshold value and a noise level are automatically set by pushing a "Threshold value/noise level measurement button". In addition, Current is set to be 1,600 μA, Gain is set to be 2, Electrolytic solution is set to be ISOTON II, and "Flush of aperture tube after measurement" is checked.

In a "Setting conversion from pulse to particle diameter" screen of the dedicated software, Bin interval is set to be logarithmic particle diameter, Particle diameter bin is set to be 256 particle diameter bin, and Particle diameter range is set to be 2 μm to 60 μm.

Specific measuring method is as described below.

(1) A 250 mL round-bottom glass beaker dedicated to Multisizer 3 is charged with 200 mL of the electrolytic aqueous solution, the beaker is set into a sample stand, and counterclockwise agitation with a stirrer rod is performed at 24 rotations/sec. Subsequently, contamination and air bubbles in an aperture tube are removed by a "Flush of aperture tube" function of the dedicated software.

(2) A 100 mL flat-bottom glass beaker is charged with 30 mL of the electrolytic aqueous solution. To the beaker, 0.3 mL of diluted liquid prepared by diluting a dispersing agent "Contaminon N" (10% by mass aqueous solution of neutral detergent for precision measurement appliance cleaning which includes a nonionic surfactant, an anionic surfactant, and an organic builder and which has a pH of 7, produced by Wako Pure Chemical Industries, Ltd.) with deionized water by a factor of 3 on a mass basis is added.

(3) An ultrasonic dispersion device "Ultrasonic Dispersion System Tetora 150" (produced by Nikkaki Bios Co., Ltd.) that includes two oscillators having an oscillation frequency of 50 kHz, with their phases shifted by 180° from each other, and that has an electrical output of 120 W is prepared. A water tank of the ultrasonic dispersion device is charged with 3.3 L of deionized water, and 2 mL of Contaminon N is added to the water tank.

(4) The beaker according to (2) above is set into a beaker fixing hole of the ultrasonic dispersion device, and the ultrasonic dispersion device is operated. Subsequently, the height position of the beaker is adjusted so that the resonance state of the liquid surface of the electrolytic aqueous solution in the beaker becomes at a maximum level.

(5) In the state in which the electrolytic aqueous solution in the beaker according to (4) above is irradiated with ultrasonic waves, 10 mg of toner particle is added gradually to the electrolytic aqueous solution and are dispersed. Subsequently, the ultrasonic dispersion treatment is continued for further 60 sec. In this regard, during the ultrasonic dispersion, the water temperature of the water tank is appropriately adjusted to become 10° C. or higher and 40° C. or lower.

(6) The electrolytic aqueous solution, according to (5) above, containing dispersed toner particle is dripped to the round-bottom beaker, according to (1) above, set into the sample stand by using a pipette so that the measured concentration is adjusted to 5%. Subsequently, the measurement is performed until the number of measured particles reaches 50,000.

(7) The weight average particle diameter (D4) is calculated by analyzing the measurement data with the dedicated software attached to the apparatus. In this regard, an "Average diameter" on an "Analysis/volume statistical value (arithmetic mean)" screen, where graph/volume % is set in the dedicated software, corresponds to the weight average particle diameter (D4) of the toner particle.

EXAMPLES

The present disclosure will be described below in further derail with reference to the examples and the comparative examples. However, the present disclosure is not limited to these. "Part" used in the example is on a mass basis, unless otherwise specified.

Production Example of Magnetic Material (One Type of Black Colorant)

An aqueous solution containing ferrous hydroxide was prepared by mixing a sodium hydroxide aqueous solution that is 1.0 equivalent to iron ions (containing 1% by mass of sodium hexametaphosphate in terms of P relative to Fe) into a ferrous sulfate aqueous solution. An oxidation reaction was performed at 80° C. by blowing air while the pH of the aqueous solution was maintained at 9 so as to prepare a slurry liquid for forming a seed crystal.

Subsequently, a ferrous sulfate aqueous solution was added to the slurry liquid so as to became 1.0 equivalent to the original amount of alkali (sodium component of sodium hydroxide). The pH of the slurry liquid was maintained at 8, and an oxidation reaction was performed while air was blown into the slurry, and the pH was adjusted to 6 at the end of the oxidation reaction. Thereafter, 1.5 parts by mass of n-$C_6H_{13}Si(OCH_3)_3$ serving as a silane coupling agent was added relative to 100 parts by mass of iron oxide, sufficient agitation was performed, and washing, filtration, and drying were performed so as to obtain hydrophobic iron oxide particle. Aggregated hydrophobic iron oxide particle was subjected to disintegration treatment and heat treatment at a temperature of 70° C. for 5 hours so as to obtain Magnetic material 1. The number average particle diameter of Magnetic material 1 was 0.25 μm.

Production Example of Polyester P1

Terephthalic acid: 29.9 parts by mass

Bisphenol A-propylene oxide 2 mol adduct: 48.5 parts by mass

Isosorbide: 1.2 parts by mass

Ethylene glycol: 4.5 parts by mass

Tetrabutoxytitanate: 0.125 parts by mass

The above-described materials were charged into an autoclave provided with a decompression device, a water separator, a nitrogen gas introduction device, a temperature measuring device, and an agitator, and a reaction was performed in a nitrogen atmosphere at normal pressure and 200° C. for 5 hours.

Thereafter, 2.1 parts by mass of trimellitic acid and 0.120 parts by mass of tetrabutoxytitanate were added, a reaction was performed at 220° C. for 3 hours, and the reaction was further performed under reduced pressure of 10 to 20 mmHg for 2 hours so as to obtain Polyester P1.

Production Example of Polyester P2

Polyester P2 was obtained by performing the same operations as Polyester P1 except that isosorbide was excluded from the production example of Polyester P1.

Production Example of Wax 1

Stearic acid 100.00 parts by mass
   Behenyl alcohol 48.00 parts by mass
   p-Toluenesulfonic acid 0.50 parts by mass The above-described materials were added under reflux, and an esterification reaction was performed at 120° C. for 6 hours. During the reaction, generated water was removed from the system by using toluene/water azeotropy. After the reaction was completed, p-toluenesulfonic acid was neutralized by using sodium hydrogen carbonate. The resulting solution was evaporated so as to remove toluene. The product was heated to 90° C. and subjected to Celite filtration so as to remove sodium p-toluenesulfonate and obtain Wax 1. The crystallization peak temperature of Wax 1 was measured by using the above-described measuring method and was 65° C.

Table 1 describes the type and physical properties of Fine particle A used in production examples below. The number average particle diameter A2, the relative permittivity, and the volume resistivity in Table 1 were measured by using the above-described measuring methods.

TABLE 1

| | Material | Number average particle diameter A2 (nm) | Relative permittivity $\varepsilon_r$ | Volume resistivity ($\Omega \cdot cm$) |
|---|---|---|---|---|
| Fine particle A1 | strontium titanate | 35 | 220 | $1.5 \times 10^5$ |
| Fine particle A2 | strontium titanate | 58 | 260 | $1.4 \times 10^5$ |
| Fine particle A3 | strontium titanate | 48 | 230 | $1.5 \times 10^5$ |
| Fine particle A4 | strontium titanate | 15 | 190 | $1.6 \times 10^5$ |
| Fine particle A5 | strontium titanate | 90 | 280 | $1.5 \times 10^5$ |
| Fine particle A6 | strontium titanate | 75 | 260 | $1.5 \times 10^5$ |
| Fine particle A7 | strontium titanate | 60 | 250 | $1.5 \times 10^5$ |
| Fine particle A8 | titanium oxide (titania) | 35 | 160 | $1.8 \times 10^5$ |
| Fine particle A9 | vanadium titanate | 50 | 1100 | $8.0 \times 10^2$ |
| Fine particle A10 | aluminum oxide (alumina) | 50 | 25 | $7.5 \times 10^5$ |
| Fine particle A11 | aluminum oxide (alumina) | 15 | 8 | $4.8 \times 10^5$ |

Production Example of Toner Particle 1

Styrene 78.0 parts by mass
   n-Butyl acrylate 22.0 parts by mass
   Polyester P1 3.0 parts by mass
   Magnetic material 1 80.0 parts by mass
   Negative charge control agent T-77 (produced by Hodogaya Chemical Co., Ltd.) 1.0 parts by mass
   Wax 1 20.0 parts by mass The above-described materials were homogenously dispersed and mixed by using Attritor (NIPPON COKE & ENGINEERING CO., LTD.). Subsequently, the temperature was raised to 60° C., and 10.0 parts by mass of 2,2'-azobis(2,4-dimethylvaleronitrile) serving as a polymerization initiator was added and mixed/dissolved in the mixture liquid so as to prepare a mixture solution containing a polymerizable monomer composition.

While Cleamix (M Technique Co., Ltd.) was used and agitation at 33 msec was performed, 450 parts by mass of 0.1 mol/L $Na_3PO_4$ aqueous solution was added to 720 parts of deionized water. Thereafter, the temperature was raised to 60° C., and 67.7 parts by mass of 1.0 mol/L $CaCl_2$ aqueous solution was added so as to obtain an aqueous medium containing calcium phosphate compound.

The above-described mixture solution was added to the aqueous medium, and granulation was performed in a nitrogen atmosphere at a temperature of 60° C. by using Cleamix (M Technique Co., Ltd.) so as to perform agitation at 33 msec for 15 min. Thereafter, agitation was performed by using a paddle mixing impeller, the temperature was raised to 70° C., and a polymerization reaction was performed for 300 min. After the polymerization reaction was completed, the temperature of the suspension was raised to 100° C. and maintained for 2 hours under reduced pressure so as to remove remaining monomers. Subsequently, as a cooling step, the suspension was cooled from 95° C. to 45° C. at 120° C./min (cooling rate). After cooling, as an annealing step, the temperature of the suspension was raised to 50° C. (annealing temperature) and was maintained for 120 min (annealing time). After the annealing step, hydrochloric acid was added to lower the pH to 2.0 or less so as to dissolve and remove the calcium phosphate compound. Further, water washing was repeated a several times, drying was performed at 40° C. for 72 hours by using a drying machine, and classification was performed by using a multi-division classifier exploiting the Coanda effect so as to obtain Toner particle 1. Table 2 describes the physical properties of Toner particle 1.

Production Examples of Toner Particle 2 to 9

Toner particle 2 to 9 were obtained in the same manner as the production example of Toner particle 1 except that the number of parts of wax, the type of polyester, the cooling rate, the annealing temperature, and the annealing time were changed as described in Table 2. Table 2 describes the physical properties of Toner particle 2 to 9.

The weight average particle diameter D4 in Table 2 was measured by using the above-described measuring method, and presence or absence of a shell was observed and checked by using the above-described observing method.

TABLE 2

| Toner particle Type | Wax Part | Polyester Type | Cooling rate (° C./min) | Annealing temperature (° C.) | Annealing time (min) | Weight average particle diameter D4 (μm) | Presence of shell |
|---|---|---|---|---|---|---|---|
| 1 | 20 | P1 | 120 | 50 | 120 | 6.1 | yes |
| 2 | 18 | P1 | 110 | 50 | 120 | 6.1 | yes |
| 3 | 21 | P1 | 125 | 50 | 120 | 6.1 | yes |
| 4 | 10 | P2 | 90 | 48 | 120 | 6.1 | yes |

TABLE 2-continued

| Toner particle Type | Wax Part | Polyester Type | Cooling rate (° C./min) | Annealing temperature (° C.) | Annealing time (min) | Weight average particle diameter D4 (μm) | Presence of shell |
|---|---|---|---|---|---|---|---|
| 5 | 22 | P2 | 120 | 50 | 150 | 6.1 | yes |
| 6 | 20 | P2 | 120 | 50 | 120 | 6.1 | yes |
| 7 | 18 | P2 | 75 | 50 | 180 | 6.1 | yes |
| 8 | 18 | P2 | 125 | 52 | 120 | 6.1 | yes |
| 9 | 28 | P2 | 125 | 50 | 120 | 6.1 | yes |

Production Example of Toner 1

Toner precursor 1-1 was obtained by performing first-stage external addition in which 100.0 parts of Toner particle 1 and 0.3 parts of sol-gel silica fine particle (number average particle diameter of 115 nm) subjected to octyltrimethoxysilane treatment were placed into an FM mixer (trade name: FM10C produced by NIPPON COKE & ENGINEERING CO., LTD.) with a treatment impeller changed from a rotator illustrated in FIGS. 3A and 3B to a rotator illustrated in FIGS. 2A and 2B, and mixing was performed at 2,000 rpm for 15 min.

At the same time with start of mixing, warm water and cold water were appropriately passed through a jacket so as to maintain the temperature inside the mixer tank at 50° C.

Thereafter, as second-stage external addition, 100 parts of Toner precursor 1-1 above and 0.2 parts of Fine particle A1 were placed into the same FM mixer as that used for the first-stage external addition. Water was passed to set the temperature in the jacket to be 7° C., and mixing was performed at 2,400 rpm for 5 min so as to obtain Toner precursor 1-2. At this time, the amount of the water passed in the jacked was appropriately adjusted so as to set the temperature inside the FM mixer tank to be 20° C. Subsequently, the resulting Toner precursor 1-2 was sifted through a mesh having an aperture of 75 μm so as to obtain Toner 1 (black toner). Table 4 describes the physical properties of Toner 1.

Figure 2A:
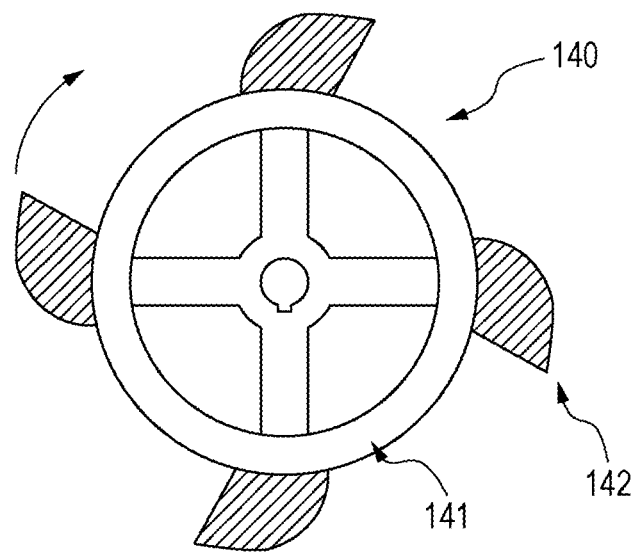
FIGS. 2A and 2B are schematic diagrams of a rotator usable in a mixer used in an external addition step according to the present disclosure.
Figure 2B:
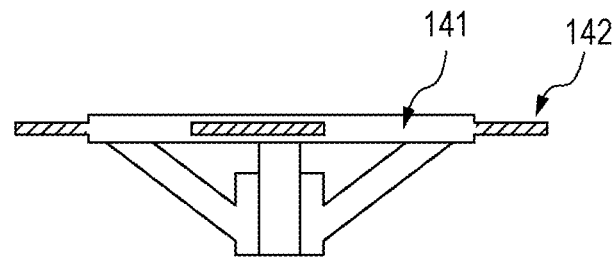
Figure 3A:
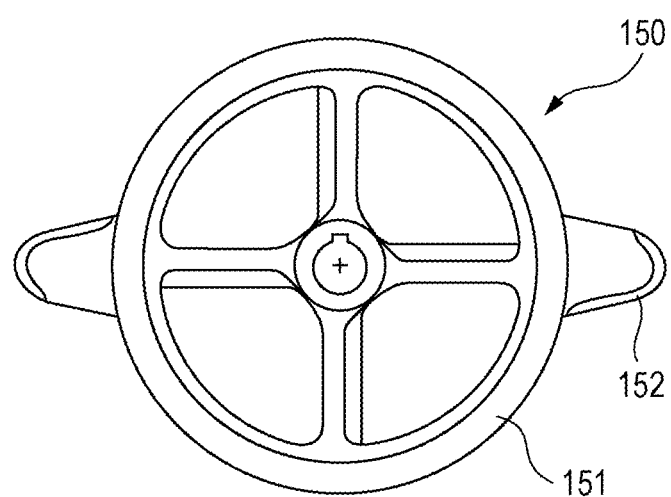
FIGS. 3A and 3B are schematic diagrams of a rotator usable in a mixer used in an external addition step according to the present disclosure.
Figure 3B:
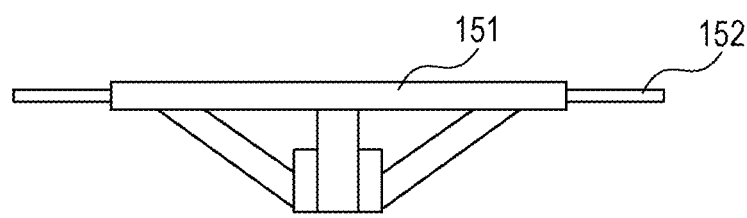

In this regard, the rotator illustrated in FIGS. 3A and 3B is a rotator included in FM10C at the point of sale. In FIGS. 2A and 2B and FIGS. 3A and 3B, 140 and 150 denote treatment impellers, 141 and 151 denote main bodies of the treatment impeller, and 142 and 152 denote treatment portions. In this regard, FIG. 2A and FIG. 3A are top views, and FIG. 2B and FIG. 3B are side views.

Production Examples of Toners 2 to 19

Toners 2 to 19 were obtained in the same manner as the production example of Toner particle 1 except that the type of toner particle, the type and the number of parts of Fine particle A, the first-stage external addition condition, and the second-stage external addition condition in the production example of Toner 1 were changed as described in Table 3. Table 4 describes the physical properties of Toners 2 to 19.

TABLE 3

| | Toner particle | Fine particle A | | First-stage external addition condition | | | | Second-stage external addition condition | | | |
|---|---|---|---|---|---|---|---|---|---|---|---|
| | | | | Impeller | Treatment | Number of rotations | Treatment temperature | Impeller | Treatment | Number of rotations | Treatment temperature |
| | Type | Type | Part | configuration | time (min) | (rpm) | (° C.) | configuration | time (min) | (rpm) | (° C.) |
| Toner 1 | 1 | A1 | 0.20 | FIG. 2 | 15 | 2000 | 50 | FIG. 2 | 5 | 2400 | 20 |
| Toner 2 | 2 | A1 | 0.20 | FIG. 2 | 15 | 1800 | 50 | FIG. 2 | 5 | 2400 | 20 |
| Toner 3 | 3 | A2 | 0.20 | FIG. 2 | 15 | 2200 | 50 | FIG. 2 | 5 | 2400 | 20 |
| Toner 4 | 4 | A1 | 0.20 | FIG. 2 | 15 | 2000 | 50 | FIG. 2 | 5 | 2400 | 20 |
| Toner 5 | 5 | A3 | 0.40 | FIG. 2 | 15 | 2000 | 50 | FIG. 2 | 5 | 2400 | 20 |
| Toner 6 | 6 | A3 | 0.20 | FIG. 2 | 15 | 2200 | 48 | FIG. 2 | 5 | 2400 | 20 |
| Toner 7 | 7 | A2 | 0.45 | FIG. 2 | 10 | 1600 | 50 | FIG. 2 | 5 | 2400 | 20 |
| Toner 8 | 5 | A2 | 0.45 | FIG. 2 | 20 | 1600 | 48 | FIG. 2 | 5 | 2400 | 20 |
| Toner 9 | 4 | A4 | 0.15 | FIG. 2 | 20 | 2500 | 48 | FIG. 2 | 5 | 2000 | 20 |
| Toner 10 | 6 | A5 | 0.60 | FIG. 2 | 15 | 2200 | 48 | FIG. 2 | 5 | 2400 | 20 |
| Toner 11 | 6 | A4 | 0.15 | FIG. 2 | 15 | 2200 | 48 | FIG. 2 | 5 | 2000 | 20 |
| Toner 12 | 8 | A6 | 0.50 | FIG. 2 | 15 | 2000 | 50 | FIG. 2 | 5 | 2400 | 20 |
| Toner 13 | 6 | A7 | 0.40 | FIG. 2 | 15 | 2200 | 48 | | | * | |
| Toner 14 | 6 | A8 | 0.30 | FIG. 2 | 15 | 2200 | 48 | FIG. 2 | 5 | 2000 | 20 |
| Toner 15 | 4 | A7 | 0.45 | FIG. 3 | 10 | 2000 | 25 | FIG. 3 | 5 | 2400 | 20 |
| Toner 16 | 9 | A7 | 0.45 | FIG. 2 | 15 | 2500 | 48 | FIG. 2 | 5 | 2400 | 20 |
| Toner 17 | 6 | A9 | 0.45 | FIG. 2 | 20 | 2000 | 50 | FIG. 2 | 5 | 2400 | 20 |
| Toner 18 | 6 | A10 | 0.45 | FIG. 2 | 15 | 2200 | 48 | FIG. 2 | 5 | 2400 | 20 |
| Toner 19 | 4 | A11 | 0.15 | FIG. 2 | 15 | 2200 | 48 | FIG. 2 | 5 | 2000 | 20 |

*In the production example of Toner 13, a second-stage external addition was not performed.

TABLE 4

| | R1 (%) | R2 (%) | Number of fine wax domains | A1 (nm) | A2 (nm) | A2/A1 | Transfer index of Fine particle A relative to polycarbonate film | Presence of unit derived from isosorbide |
|---|---|---|---|---|---|---|---|---|
| Toner 1 | 8.0 | 8.6 | 221 | 80 | 35 | 0.44 | 5.1 | yes |
| Toner 2 | 5.1 | 5.6 | 182 | 62 | 35 | 0.56 | 4.9 | yes |
| Toner 3 | 10.9 | 11.9 | 261 | 92 | 58 | 0.63 | 5.2 | yes |
| Toner 4 | 3.1 | 3.5 | 158 | 43 | 35 | 0.82 | 4.7 | none |
| Toner 5 | 14.8 | 15.9 | 280 | 116 | 48 | 0.41 | 4.5 | none |
| Toner 6 | 7.6 | 8.1 | 210 | 80 | 48 | 0.60 | 5.5 | none |
| Toner 7 | 5.7 | 9.6 | 92 | 136 | 58 | 0.43 | 4.1 | none |
| Toner 8 | 14.3 | 19.5 | 198 | 157 | 58 | 0.37 | 4.1 | none |
| Toner 9 | 3.2 | 3.4 | 262 | 27 | 15 | 0.55 | 4.0 | none |
| Toner 10 | 7.6 | 8.0 | 215 | 80 | 90 | 1.13 | 4.8 | none |
| Toner 11 | 7.6 | 8.1 | 208 | 80 | 15 | 0.19 | 3.7 | none |
| Toner 12 | 5.1 | 5.5 | 200 | 56 | 75 | 1.34 | 5.1 | none |
| Toner 13 | 7.6 | 8.2 | 217 | 80 | 60 | 0.75 | 3.1 | none |
| Toner 14 | 7.6 | 8.1 | 211 | 80 | 35 | 0.75 | 4.0 | none |
| Toner 15 | 2.6 | 3.2 | 124 | 105 | 60 | 0.57 | 4.6 | none |
| Toner 16 | 16.0 | 18.2 | 303 | 105 | 60 | 0.57 | 4.1 | none |
| Toner 17 | 7.6 | 8.2 | 207 | 80 | 50 | 0.63 | 4.6 | none |
| Toner 18 | 7.6 | 8.1 | 211 | 80 | 50 | 0.63 | 4.1 | none |
| Toner 19 | 3.1 | 3.4 | 161 | 43 | 15 | 0.35 | 3.8 | none |

The physical properties of the toner described in Table 4 were measured by using the above-described measuring methods.

Example 1

Toner 1 was evaluated as described below. Table 5 describes the evaluation results.

Evaluation of Low-Temperature Fixability

Regarding the evaluation of the low-temperature fixability, a modified machine of a laser beam printer (trade name: HP LaserJet Enterprise M609dn produced by HP) was used as an image forming apparatus. The modification point of the image forming apparatus was that it was made possible to optionally set the fixing temperature of a fixing unit. In this regard, the sheet used for image formation was white sheet (trade name: GF-0081, Canon Marketing Japan Inc., 81.4 g/m$^2$).

Initially, a toner inside a cartridge is removed so as to empty the cartridge. Thereafter, the cartridge was charged with 300 g of Toner 1.

In a low-temperature, low-humidity environment (7.5° C./15% RH), the above-described modified machine and the white sheet were used, the temperature of the fixing unit was controlled at intervals of 5° C. in the range of 170° C. or higher and 230° C. or lower, and a half-tone image was output at each temperature. At this time, a bias was adjusted so that the image density of the half-tone image at each temperature was set to be 0.60 to 0.65. The image density was measured by using a Macbeth densitometer (produced by Macbeth) serving as a reflective densitometer and by using an SPI filter.

Each of the resulting half-tone images was subjected to 5 times of reciprocating rubbing with lens-cleaning paper to which a load of 4.9 kPa was applied. An image with an image density that exhibited a decreasing rate between before and after rubbing of 15% or less was output. The lowest fixing temperature was taken as evaluation of the low-temperature fixability. The toner having a fixing temperature of 190° C. or lower was assumed to be a toner that realized the effect of the present disclosure.

Evaluation of Image Density

The image density was evaluated by using the image forming apparatus and the white sheet that were used in the above-described evaluation of the low-temperature fixability. In the evaluation, the image forming apparatus that was not modified was used.

In a high-temperature, high-humidity environment (30.0° C., 80% RH), 100 horizontal line patterns with a printing ratio of 1% were output, and, thereafter, the apparatus was stopped for 10 days. Subsequently, a solid black image of 5 mm×5 mm was output, and the image density of the solid black image was measured. The image density was measured by using a Macbeth densitometer (produced by Macbeth) serving as a reflective densitometer and by using an SPI filter. Regarding the measurement, the toner having an image density of 1.35 or more was assumed to be a toner that realized the effect of the present disclosure.

Evaluation of Soiling of Non-Image Portion

After the above-described image density measurement, in a high-temperature, high-humidity environment (30.0° C., 80% RH), a solid white image was output, and the image density (%) was measured. In addition, the image density (%) of white sheet that was not run was measured. The difference (%) between the two image densities was calculated, and soiling of the non-image portion due to the toner was evaluated by using the resulting value. Regarding the measurement, the image density was measured by using TC-6DS (produced by Tokyo Denshoku Co., Ltd.), and the average value of 5 measurement results was taken as the image density. In the case in which the difference in the image density measurement was less than 2.5%, the result was assumed to be favorable.

Evaluation of Appearance of Development Stripe

After the above-described evaluation of soiling of non-image portion, in a high-temperature, high-humidity environment (30.0° C., 80% RH), 100 solid white images were output. Thereafter, a half-tone image was formed where the amount of toner placed was 0.2 mg/cm$^2$. The half-tone image and a developing roller were visually examined, and evaluation was performed on the basis of the state. The evaluation criteria are as described below.

Evaluation Criteria

A: no stripe appeared on the developing roller and the half-tone image

B: 1 to 3 fine stripes appeared on the developing roller in the circumferential direction, but no stripe appeared on the half-tone image C: 1 to 3 fine stripes appeared on the developing roller in the circumferential direction, and 1 to 3 fine stripes appeared also on the half-tone image D: 4 or more stripes appeared on the developing roller and the half-tone image Examples 2 to 14 and Comparative examples 1 to 5

Evaluation was performed in the same manner as in Example 1. Table 5 describes the evaluation results.

TABLE 5

| | | Low-temperature, low-humidity environment Low-temperature fixability Fixing temperature (° C.) | Image density | High-temperature, high-humidity environment Non-image portion soiling Image density difference (%) | Appearance of stripe |
|---|---|---|---|---|---|
| Example 1 | Toner 1 | 180 | 1.47 | 0.5 | A |
| Example 2 | Toner 2 | 185 | 1.45 | 0.5 | A |
| Example 3 | Toner 3 | 180 | 1.45 | 0.8 | A |
| Example 4 | Toner 4 | 185 | 1.42 | 1.1 | A |
| Example 5 | Toner 5 | 180 | 1.37 | 1.8 | A |
| Example 6 | Toner 6 | 180 | 1.44 | 1.1 | A |
| Example 7 | Toner 7 | 190 | 1.40 | 1.9 | B |
| Example 8 | Toner 8 | 180 | 1.40 | 2.1 | B |
| Example 9 | Toner 9 | 185 | 1.36 | 1.6 | B |
| Example 10 | Toner 10 | 185 | 1.36 | 1.9 | A |
| Example 11 | Toner 11 | 185 | 1.39 | 1.1 | B |
| Example 12 | Toner 12 | 185 | 1.38 | 1.3 | B |
| Example 13 | Toner 13 | 185 | 1.35 | 2.2 | C |
| Example 14 | Toner 14 | 185 | 1.36 | 1.9 | B |
| Comparative example 1 | Toner 15 | 200 | 1.39 | 0.8 | A |
| Comparative example 2 | Toner 16 | 175 | 1.28 | 3.2 | B |
| Comparative example 3 | Toner 17 | 190 | 1.15 | 3.9 | A |
| Comparative example 4 | Toner 18 | 190 | 1.36 | 4.2 | D |
| Comparative example 5 | Toner 19 | 190 | 1.29 | 4.5 | D |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-142843, filed Aug. 26, 2020 and Japanese Patent Application No. 2021-108996, filed Jun. 30, 2021, which are hereby incorporated by reference herein in their entirety.

What is claimed is:

1. A toner comprising:
a toner particle containing a resin component and a wax; and
an inorganic fine particle on the surface of the toner particle,
wherein, in a cross section of the toner particle, domains containing the wax are observed, and when among the domains, domains having a major diameter of 10-300 nm are defined as domains S, an occupation area percentage of which a ratio of a total sum of areas occupied by the domains S in a region from a surface of the toner particle to a depth of 600 nm in the cross section with respect to an area of the region, is 3.0-15.0%, and
wherein the inorganic fine particle contains a fine particle A having a volume resistivity of $1.0 \times 10^3$ to $3.0 \times 10^5$ Ω·cm, and having a relative permittivity εr of 100 or more.

2. The toner according to claim 1,
wherein the number average major diameter of all the domains in the region, is 30 to 150 nm.

3. The toner according to claim 1,
wherein an occupation area percentage of which a ratio of a total sum of areas occupied by all the domains in the region with respect to an area of the region, is 3.0 to 25.0%.

4. The toner according to claim 1,
wherein the number of the Domains S in the region is 100 or more.

5. The toner according to claim 1,
wherein,
when a number average major diameter of all the domains in the region is defined as A1, and when a number average particle diameter of the fine particle A is defined as A2,
the A1 and the A2 satisfy a relationship denoted by Formula (1), $$0.3 \leq A2/A1 \leq 1.2 \qquad (1).$$

6. The toner according to claim 1,
wherein the transfer index of the fine particle A relative to a polycarbonate film calculated by Formula (2) is 3.5 to 6.5, transfer index relative to polycarbonate film=area percentage of the fine particle $A$ transferred to polycarbonate film[$X1$]/coverage of surface of toner particle with the fine particle $A$[$X2$]×100  (2).

7. The toner according to claim 1,
wherein the fine particle A is strontium titanate.

8. The toner according to claim 1,
wherein the toner particle includes a core containing the resin component and the wax and a shell covering the surface of the core, and
the shell contains Polyester P having a monomer unit denoted by Formula (3)

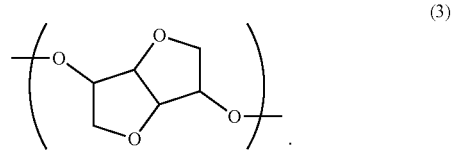

(3)

9. The toner according to claim 1,
wherein the relative permittivity εr of the fine particle A is 100 to 300.

10. The toner according to claim 1,
wherein weight average particle diameter (D4) of the toner particle is 5.0 to 10.0 μm.

11. The toner according to claim 1,
wherein the resin component contains a styrene-acrylic resin, and
the content of the styrene-acrylic resin in the resin component is 80.0% to 100.0% by mass.

12. The toner according to claim 1,
wherein the wax is an ester wax, and
the content of the wax in the toner particle is 5.0% to 25.0% by mass.

13. The toner according to claim 1,
wherein number average particle diameter of the fine particle A is 10 to 80 nm.

14. The toner according to claim 1,
wherein the toner is a magnetic toner.

15. A toner comprising:
a toner particle containing a resin component and a wax; and
an inorganic fine particle on the surface of the toner particle,
wherein, in a cross section of the toner particle, domains containing the wax are observed, and when among the domains, domains having a major diameter of 10-300 nm are defined as domains S, an occupation area percentage of which a ratio of a total sum of areas occupied by the domains S in a region from a surface of the toner particle to a depth of 600 nm in the cross section with respect to an area of the region, is 3.0-15.0%, and
wherein the inorganic fine particle contains strontium titanate.

16. A method for producing a toner comprising the steps of:
(i) forming, in an aqueous medium, a particle containing a wax and a polymerizable monomer;
(ii) obtaining a dispersion liquid including a toner particle that contains the wax and a resin component obtained by polymerizing the polymerizable monomer contained in the particle;
(iii) maintaining the dispersion liquid at Ta+15 (° C.) to Ta+35 (° C.) where Ta denotes the crystallization peak temperature of the wax;
(iv) cooling the dispersion liquid to Ta−35 (° C.) to Ta−20 (° C.) from Ta+15 (° C.) to Ta+35 (° C.), with a cooling rate of 40.0° C./min to 200.0° C./min;
(v) annealing the dispersion liquid by maintaining at Ta−35 (° C.) to Ta−20 (° C.) for 30 min or more;
(vi) removing the toner particle from the dispersion liquid; and
(vii) externally adding inorganic fine particle to the toner particle removed at Ta−35 (° C.) to Ta−20 (° C.), wherein the inorganic fine particle contains a fine particle A having a volume resistivity of $1.0 \times 10^3$ to $3.0 \times 10^5$ Ω·cm, and having a relative permittivity εr of 100 or more.

* * * * *